United States Patent [19]
Mayer

[11] 3,716,328
[45] Feb. 13, 1973

[54] ANTHRAQUINONE DYED NYLON STABILIZED WITH BUTYLIDENE BIS (BUTYL CRESOL) AND POLYHYDROXYETHYL-OCTADECYLAMINES

[75] Inventor: Richard Eugene Mayer, Richmond, Va.

[73] Assignee: Allied Chemical Corporation, New York, N.Y.

[22] Filed: Sept. 9, 1971

[21] Appl. No.: 179,222

Related U.S. Application Data

[62] Division of Ser. No. 774,175, Nov. 7, 1968, abandoned.

[52] U.S. Cl. ............................8/165, 8/39, 260/45.9
[51] Int. Cl. .................................................D06p 5/02
[58] Field of Search....................................8/74, 165

[56] References Cited

UNITED STATES PATENTS

| | | | |
|---|---|---|---|
| 2,287,188 | 6/1942 | Matheson | 260/45.9 |
| 3,071,427 | 1/1963 | Buehler | 8/88 X |
| 3,351,678 | 11/1967 | McBurney | 260/45.15 |
| 3,296,163 | 1/1967 | Manaresi | 260/45.9 LD |
| 3,364,262 | 1/1968 | Cyba | 260/45.9 |
| 3,445,498 | 5/1969 | Cyba | 260/45.9 |
| 3,407,140 | 10/1968 | Chiddix | 260/45.95 |

OTHER PUBLICATIONS

American Dyestuff Reporter, Dec. 5, 1966, pages 1065-1071.

Strobel, American Dyestuff Reporter, Aug. 7, 1961 page 583-588.
Salven, American Dyestuff Reporter, May 12, 1952, Pages 297-304.

*Primary Examiner*—Donald Levy
*Attorney*—Fred L. Kelly et al.

[57] ABSTRACT

The rate of fading of dyed textiles due to ozone action is substantially reduced through the incorporation therein of:

a. a compound chosen from the class of amines with ethyleneoxy substituents having the structural formulas:

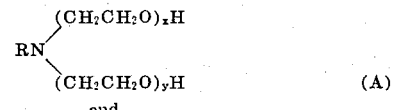

(A)

and

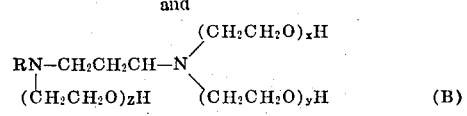

(B)

wherein R is an alkyl or aralkyl radical with four to 25 carbon atoms, and $x$, $y$ and $z$ are integers such that $x + y$ is equal to or less than 10 in A compounds and $x + y + z$ is equal to or less than 10 in B compounds; and
b. a phenolic compound chosen from the group consisting of 4,4'-butylidene bis(6-tert-butyl-m-cresol), p-nonylphenol, 1,3,5 trimethyl-2,4,6-tris (3,5 di-tert-butyl-4-hydroxy benzyl) benzene, and 6-tert-butyl-m-cresol.

2 Claims, No Drawings

ANTHRAQUINONE DYED NYLON STABILIZED WITH BUTYLIDENE BIS (BUTYL CRESOL) AND POLYHYDROXYETHYL-OCTADECYLAMINES

REFERENCE TO RELATED APPLICATIONS

This application is a continuation-in-part of my copending application Ser. No. 774,175, filed Nov. 7, 1968 now abandoned.

BACKGROUND OF THE INVENTION

The primary object of this invention is to reduce or prevent the fading of dyed textiles, particularly dyed nylon fabrics, caused by ozone. By fading is meant loss of fastness of the dye, i.e., the dye becomes less bright or changes color, for example, dark blue to light blue.

Ozone is present in air at sea level at a concentration of only 1 to 5 parts per hundred million. Only under conditions of heavy smog does it rise as high as 60 parts per hundred million. Despite this extremely low concentration of ozone, severe fading is observed.

Ozone is an allotropic form of oxygen. The molecule of ozone consists of three atoms of oxygen whereas a molecule of oxygen contains two atoms of oxygen. Ozone is formed in the upper atmosphere by the action of high energy radiation from the sun splitting oxygen molecules into two oxygen atoms. These atoms then combine with oxygen ($O_2$) molecules to form ozone ($O_3$). This ozone then diffuses down through the atmosphere.

Ozone is an electrophilic reagent, that is, it searches out and attacks electron pairs such as those existing with carbon-carbon double bonds. It is noteworthy that ozone fading is different from light fading as evidenced by the fact that ozone fading can occur in a dark room, as when textiles are stored in a warehouse. Thus, prior art relating to light fading is not pertinent to the instant invention.

The dyes which are attacked are usually anthraquinone type disperse dyes, although it is believed that under severe conditions almost all dyes might be affected by ozone.

One of the most sensitive dyes to ozone fading is Disperse Blue 3 (Color Index No. 61505). The major constituent of Disperse Blue 3 has the structure:

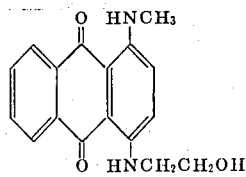

The dye diffuses through the fiber to contact the ozone at the surface of the fiber. Part of the evidence for this is that any treatment or additive that increases the mobility of the dye, increases its ozone fading.

Ozone fading can be decreased by reduction of the specific surface area of the yarn. This is undesirable when a bulky yarn is required. Ozone fading can also be decreased by changes in polymer morphology and orientation but these techniques are inherently expensive.

In accordance with the instant invention ozone fading of dyed textile materials, and more particularly ozone fading of dyed nylon textiles, is substantially inhibited.

Further objects and advantages of the present invention will become apparent from the following detailed description thereof.

SUMMARY OF THE INVENTION

This invention relates to a chemical combination that substantially reduces the rate of fading in dyed materials prepared from fiber forming polyamides, when fading is caused by ozone attack. Said chemical combination of inhibitor comprising a hindered phenol and an amine with ethyleneoxy substituents is particularly useful when applied to dyed nylon textiles. The aforementioned combination has been shown to exert a synergistic inhibitive effect, since the total inhibitive effect of the discrete agencies is greater than the sum of the two effects taken independently.

The term nylons as herein used should be construed as those polyamides obtained by condensation of diamines with dicarboxylic acids or by the autocondensation of amine-substituted carboxylic acids, such as initial materials generally having at least six atoms in a chain. For example, the most common specific nylon resin is that obtained by the polycondensation of hexamethylenediamine adipate.

Particularly good results are obtained when amines of the type

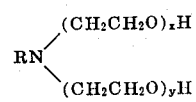

where R is an alkyl or aralkyl radical containing four to 25 carbon atoms, $x$ and $y$ are integers such that $x + y$ is equal to and preferably less than 10, are placed in combination with a hindered phenol, such as 4,4'-butylidene bis (6-tert-butyl-m-cresol) which has the following structure,

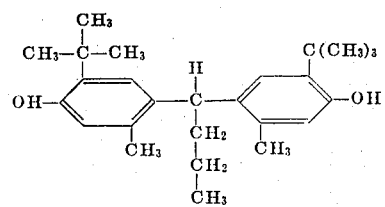

Another preferred amine that may be combined with a hindered phenol is an amine of the type

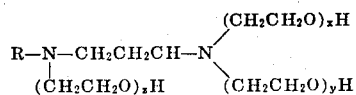

wherein R is an alkyl or aralkyl radical with four to 25 carbon atoms, $x$, $y$ and $z$ are integers such that $x+y+z$ is equal to and preferably less than 10.

The inhibitors may be added during the nylon polymerization cycle, coated to nylon chips prior to spinning or injected during spinning. Dyes particularly protected are of the anthraquinone class, more specifically those anthraquinone dyes containing amino or substituted amino groups, such as 1-amino-4-hydroxy and 1:4-diamino-anthraquinones.

DESCRIPTION OF THE PREFERRED EMBODIMENTS

According to the instant invention it is found that the presence of at least 0.1 percent, and preferably at least about 0.5 percent, by weight of a tertiary amine and similarly at least 0.1 percent, and preferably at least about 0.5 percent by weight of a hindered phenol on the polyamide material is generally adequate for inhibiting ozone fading. The inhibitors are generally introduced before or after dyeing the materials. In accordance with the practice of the instant invention it is preferred that both inhibitors be added during the nylon polymerization cycle, coated to nylon chips prior to spinning or injected during spinning. However, the tertiary amines of this invention may be exhausted onto the textile material from the same aqueous bath used to apply the dye thereto. When the tertiary amines are applied in a dyeing bath, the bath may be maintained at conventional temperatures, such as about 60°C.

The preferred phenolic inhibitors of this invention include 1,3,5-trimethyl-2,4,6-tris(3,5-di-tert-butyl-4-hydroxybenzyl)benzene, 6-tert-butyl-m-cresol, 4,4'-butylidene bis(6-tert-butyl-m-cresol) and p-nonylphenol. The preferred tertiary amines are N,N-di-(2-hydroxyethyl)octadecylamine $[C_{18}H_{35}N(CH_2CH_2OH)_2]$ and N,N,N'-tri-(2-hydroxyethyl)-N'-octadecyl-1,3-propylene diamine $[C_{18}H_{35}N(CH_2CH_2OH)CH_2CH_2CH_2N(CH_2CH_2OH)_2]$.

When one member of each class of preferred compounds is present in a nylon material such that the combination comprises between 0.2 and 5 percent, and preferably about 3 percent, by weight on the nylon material, ozone fading is appreciably reduced, as shown in the examples below. It is thus found that the combination of compounds exerts a fading-inhibitive effect disproportionate to the effect produced by adding a single preferred compound.

The following examples illustrate the present invention in greater detail. In these examples, the parts are by weight unless otherwise noted.

EXAMPLE I

The following is an example showing preferred additives and their behavior on being added to nylon polymer chips, spun into yarn, dyed, and exposed to ozone.

The polymer was a polycaprolactam of about 20,000 number average molecular weight, about 60 formic acid reactive viscosity, (FAV), about 50 amine ends per $10^6$ grams polymer and 50 carboxyl ends per $10^6$ grams polymer. About 1000 grams of polymer chips were used, and 50 grams of 4,4'-butylidene bis(6-tert-butyl-m-cresol) and 50 grams of N,N-di-(2-hydroxyethyl)-octadecylamine were uniformly coated onto the chips prior to spinning.

The polymer was spun into 14 filaments having a total denier of about 210, at a spinning temperature of about 260 to 265°C. The yarn was drawn at a ratio of 3.2.

This yarn and a control yarn made in the same manner, but without adding any additive, were both knitted into sleeves and dyed in a conventional dye bath buffered with 2 percent trisodium phosphate and comprising several dyes. The sleeves were dyed with Olive 1 dye which consists of 0.069 percent on weight of fabric (O.W.F.), Disperse Blue 3, such as Celliton Blue FFRN, (1-methylamino-4-hydroxyethylaminoanthraquinone), 0.0807% (O.W.F.) Celliton Pink RF, and 0.465% (O.W.F.) Celliton Yellow GA. The Disperse Blue 3 is especially sensitive to ozone fumes.

The sleeves were then subjected for 9 hours to an ozone atmosphere of about 300 pphm (parts per hundred million) ozone at a temperature of 104°F. at a relative humidity of about 95 percent. The change in color can be determined visually or using a Hunterlab Color Difference Meter as follows:

$\Delta E$ is a measure of the change of color, a smaller $\Delta E$ being less fading.

Color Difference ($\Delta E$)

$$\Delta E = \sqrt{(\Delta L)^2 + (\Delta a)^2 + (\Delta b)^2}$$

where
$\Delta L = L_1 - L_2$
$\Delta a = a_1 - a_2$
$\Delta b = b_1 - b_2$

L, a and b are readings on the Hunterlab Color Difference Meter: L is a 100–0 reading of white to black measurements; a measures redness when + and gray when zero and green when minus' b measures yellow when +, gray when zero and blue when minus.

The results are shown in the following table:

| Yarn Additive | $\Delta E$ |
|---|---|
| None (control nylon) | 5.3 |
| 4,4' butylidene bis(6-tert-butyl-m-cresol) plus N,N-di(2-hydroxyethyl) octadecylamine | 3.0 |

The Hunterlab Color Difference Meter measures color as seen in average daylight, in a manner similar to the way in which the human eye responds to the stimulus of color. Experimentation has shown that the eye can match any color with a combination of three "primary" colored lights, and therefore, that any color can be specified by a three dimensional identification. The Color Difference Meter measures the light reflected by a specimen through filters that correspond to the three "primary" lights. The measurements made, therefore, correspond to the way the average human eye responds to light, as these responses are set forth in the CIE "Standard Observer." The "Standard Observer" is a table of values derived from experiments with human observers, and recommended for use in 1931 by the International Commission on Illumination (ICI).

EXAMPLE II

The procedure of Example I was repeated except that 50 grams of 4,4'-butylidene bis(6-tert-butyl-m-cresol) were uniformly coated on the polymer chips prior to spinning.

The results are shown in the following table:

| Yarn Additive | $\Delta E$ |
|---|---|
| None (control nylon) | 5.3 |
| 4,4' butylidene bis(6-tert-butyl-m-cresol) | 5.4 |

EXAMPLE III

The procedure of Example I was repeated except that 50 grams of N,N-di-(2-hydroxyethyl)octadecylamine were uniformly coated on the polycaprolactam chips prior to spinning.

The results are shown in the following table:

| Yarn Additive | ΔE |
|---|---|
| None (control nylon) | 5.3 |
| N,N-di(2-hydroxyethyl)octadecylamine | 4.1 |

A comparison of Examples I, II and III shows that the chemical combination of inhibitor comprising a hindered phenol and a tertiary amine with ethyleneoxy substituents exerts a synergistic inhibitive effect, because the total effect of the discrete agencies is greater than the sum of the two effects taken independently.

EXAMPLE IV

The procedure of Example I was repeated except that 50 grams of tertiary amine consisting of ethoxylated stearyl amine with 5 moles of ethylene oxide per mol of amine and 50 grams of 4,4'-butylidene bis(6-tert-butyl-m-cresol) were uniformly coated on the polymer chips prior to spinning.

The results are shown in the following table:

| Yarn Additive | ΔE |
|---|---|
| None (control nylon) | 5.3 |
| 4,4' butylidene bis(6-tert-butyl-m-cresol) plus ethoxylated stearyl amine with 5 moles of ethylene oxide per mol of amine | 3.0 |

EXAMPLE V

The procedure of Example III was repeated except N,N,N'-tri(2-hydroxyethyl)-N'-octadecyl-1,3-propylene-diamine was added in place of N,N-di(2-hydroxyethyl) octadecylamine.

The results are shown in the following table:

| Yarn Additive | ΔE |
|---|---|
| None (control nylon) | 5.3 |
| N,N,N'-tri(2-hydroxyethyl)-N'-octadecyl-1,3-propylenediamine | 3.9 |

EXAMPLE VI

The procedure of Example I was repeated except N,N,N'-tri(2-hydroxyethyl)-N'-octadecyl-1,3-propylene-diamine was added in place of N,N-di(2-hydroxyethyl) octadecylamine.

The results are shown in the following table:

| Yarn Additive | ΔE |
|---|---|
| None (control nylon) | 5.3 |
| 4,4'butylidene bis(6-tert-butyl-m-cresol plus N,N,N'-tri(2-hydroxy-ethyl)-N'-octadecyl-1,3-propylenediamine | 2.5 |

The following three examples illustrate a simple test that may be used to predict the efficiency of various additives when incorporated into dyed yarn samples.

EXAMPLE VII 0.1 part of Disperse Blue 3 (Color Index No. 61505), 10 parts of sodium bicarbonate, 500 parts of ε-caprolactam and 5 parts of 4,4'-butylidene bis(6-tert-butyl-m-cresol) were admixed. The misture was then diluted with water to a volume of 1 liter. A 100 ml. aliquot of the solution was withdrawn and ozone enriched oxygen was bubbled through the solution. The initial pH of the aliquot was 9.5. The flow rate of ozone into the solution was 40 cc/minute. After 20 hours the blue color was hardly discernable from the solution. This sample was used as the control.

EXAMPLE VIII

The procedure of Example VII was repeated, however, 0.25 part of N,N-di-(2-hydroxyethyl)octadecylamine was added to the withdrawn aliquot prior to ozone exposure. The initial pH of the aliquot was 10.0. After 24 hours the solution still retained its blue color.

EXAMPLE IX

The procedure of Example VII was repeated, however, 0.18 part of N,N,N'-tri-(2 hydroxyethyl)-N'-octadecyl-1,3-propylenediamine was added to the withdrawn aliquot prior to ozone exposure. The initial pH of the aliquot was 9.5. After 24 hours the solution still retained its blue color.

The same good results were obtained when the inhibitors as set forth in Examples VIII and IX were incorporated into dyed yarn samples spun from poly-ε-caprolactam filaments, said samples being exposed to ozone enriched air in an ozone chamber for extended periods of time.

Although specific examples of the present invention are set forth above, it is not intended that this invention be limited except as set forth in the claims.

I claim:

1. A fiber-forming polyamide material resistant to ozone fading comprising fibers dyed with an anthraquinone dye and having incorporated therein from about 0.2 percent to about 5.0 percent of 4,4'-butylidene bis(6-tert-butyl-m-cresol) and from about 0.5 percent to about 2.5 percent of N,N-di-(2-hydroxyethyl) octadecylamine.

2. A fiber-forming polyamide material resistant to ozone fading comprising fibers dyed with an anthraquinone dye and having incorporated therein from about 0.2 percent to about 5.0 percent of 4,4'-butylidene bis(6-tert-butyl-m-cresol) and from about 0.5 percent to about 2.5 percent of N,N,N'-tri-(2-hydroxyethyl)-N'-octadecyl-1,3-propylene diamine.

* * * * *